United States Patent [19]

Priesch et al.

[11] Patent Number: 4,898,772

[45] Date of Patent: Feb. 6, 1990

[54] ABHESIVE COATING PREPARATION AND METHOD OF ABHESIVELY COATING UTENSILS

[75] Inventors: Manfred Priesch, Recklinghausen; Harald Rau; Christian Weitemeyer, both of Essen, all of Fed. Rep. of Germany

[73] Assignee: Th. Goldschmidt AG, Essen, Fed. Rep. of Germany

[21] Appl. No.: 228,246

[22] Filed: Aug. 4, 1988

[30] Foreign Application Priority Data

Aug. 26, 1987 [DE] Fed. Rep. of Germany ....... 3728414

[51] Int. Cl.$^4$ ......................... B32B 9/04; B32B 15/08
[52] U.S. Cl. .................................... 428/332; 428/447; 428/457
[58] Field of Search ....................... 428/447, 457, 332; 528/26

[56] References Cited

U.S. PATENT DOCUMENTS 4,302,512  11/1981  Weitemeyer et al. ............... 428/447
4,452,961   6/1984  Koermer et al. ...................... 528/26

FOREIGN PATENT DOCUMENTS 0017958  11/1982  European Pat. Off. ............ 428/447
0092701   1/1987  European Pat. Off. ............ 428/447
2152946   8/1985  United Kingdom ................ 428/447

Primary Examiner—Thomas J. Herbert
Attorney, Agent, or Firm—Toren & McGeady

[57] ABSTRACT

A preparation for the abhesive coating of baking tins, baking molds, frying pans, metal pots and the like is disclosed. The preparation which comprises predominantly a heat-curable, polyol-modified polysiloxane A and 0.05 to 4% by weight, based on polysiloxane A, of a linear siloxane B that is capable of reacting with polysiloxane A. The modified polysiloxane A is obtained by reaction of a polysiloxane A1 of the general formula.

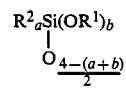

wherein
$OR^1$ is an alkoxy group, derived from a primary or scondary alcohol with 1 to 4 carbon atoms,
$R^2$ is alkyl and/or phenyl,
$a = 1$ to 1.5,
$b = 0.1$ to 0.08, with a multihydric alcohol A2, with the characteristic feature that, as multihydric alcohol A2, is used an ester group-containing polyo of the general formula

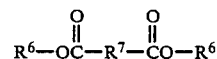

which can be obtained by the esterification of 1 mole of dicarboxylic acid $HOOC-R^7-COOH$ with 2 moles of alcohol of formula $R^6OH$, the $R^6$ groups in the molecule being the same or different and representing the groups

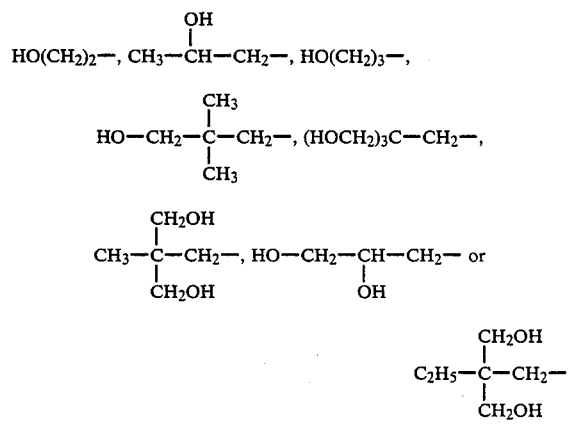

wherein $R^7$ is an alkylene, cycloalklene or phenylene group, and the polyol containing the ester groups has at least three hydroxyl groups.

12 Claims, No Drawings

ABHESIVE COATING PREPARATION AND METHOD OF ABHESIVELY COATING UTENSILS

FIELD OF INVENTION

The invention is directed to a preparation for the abhesive coating of utensils or implements, such as baking tins, baking molds, frying pans, metal pots, and the like which, after having been baked onto or bonded with the metal surfaces of the utensils prevents sticking of foods processed in the utensils and facilitates removal of the foods from the treated surfaces.

The inventive abhesive preparation is effective for all the usual manners in which food is prepared, to wit baking, roasting, grilling, broiling, frying and the like, and is also effective in respect to sugar and fat-containing foods.

The abhesive coating preparation of the invention comprises predominantly a heat-curable polyol-modified polysiloxane A and 0.05 to 4% by weight, based on polysiloxane A, of a linear siloxane B that is capable of reacting with polysiloxane A. The modified polysiloxane A is obtained by reaction of a polysiloxane A1 of the general formula

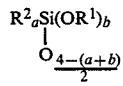

wherein $OR^1$ is an alkoxy group, derived from a primary or secondary alcohol with 1 to 4 carbon atoms, $R^2$ is alkyl and/or phenyl, a=1 to 1.5, b=0.1 to 0.8, with a multihydric alcohol A2. The reaction is carried out in such a molar ratio, that one $SiOR^1$ group corresponds approximately to one COH group. The reaction is terminate after a 25 to 90% degree of conversion. The reactive linear polysiloxane B corresponds to the general formula

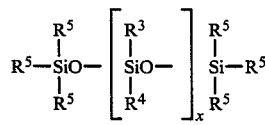

wherein $R^3R^4$ are the same or different and represent methyl or phenyl groups, with the proviso that at least 80 mole percent of these groups are methyl, $R^5$ are the same or different alkyl groups with 1 to 4 carbon atoms and/or phenyl groups and/or groups capable of reacting with the $SIOR^1$ or COH grops of the modified polysiloxane A, with the proviso that at least one $R^5$ group is such a reactive group, $x \geq 0$.

The invention is directed particularly to a preparation of the aforementioned type, which is especially suitable for baking and cooking implements that are highly streseed mechanically and which provides coatings of high hardness after stoving. This high hardness is to be retained even at temperatures encountered, for example, during roasting, grilling broiling and frying, that is, at temperatures of about 180° C. and higher.

BACKGROUND INFORMATION AND PRIOR ART

In the European Patent No. 0 017 958, a preparation for the abhesive coating of baking and cooking implements is described. This preparation comprises predominantly heat-curable polysiloxane resins and linear siloxanes, which can react with these polysiloxane resins. This mixture of heat-curable polysiloxane resin and reactive, linear polysiloxane is advantageously stoved or baked on the surface of the metal in the presence of conventional curing catalysts at about 200° to 300° C.

As heat-curable siloxane resin, a polymer can be used, which is obtained by reacting siloxanes of the general formula

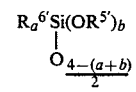

wherein $OR^{5'}$ is an alkoxy group of primary or secondary aliphatic alcohols with 1 to 4 carbon atoms, $R^{6'}$ is alkyl and/or phenyl, a has a value of 1.0 to 1.5, b has a value of 0.1 to 0.7, with low molecular weight, multihydric alcohols at temperatures of 100° to 160° C., if necessary, in the presence of known transesterification catalysts and solvents with removal of the $R^{5'}$ OH alcohol, in such a quantitative ratio, that one $SiOR^{5'}$ group approximately corresponds to one COH group, with the proviso that the reaction is terminated after a 25 to 80% conversion by cooling to a temperature below 100° C.

As reactive, linear polysiloxane, one having the formula

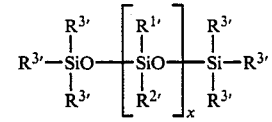

is used, wherein $R^{1'}$, $R^{2'}$ are the same or different and represent methyl or phenyl, with the proviso that at least 80 mole percent of these groups are methyl, the $R^{3'}$ groups are the same or different and represent one or several moieties from the group of (a) alkyl moieties with 1 to 4 carbon atoms, (b) phenyl moieties, (c) moieties capable of reacting with those groups of the curable polysiloxane resin, which are capable of undergoing condensation reactions with the proviso that at least one $R^{3'}$ group has the means c), x=0 or a whole number >0.

The reactive linear polysiloxane is contained in the preparation in an amount of 0.05 to 4% by weight, based on the siloxane resin that has been modified with the low molecular weight, multihydric alcohol.

The surface coatings, obtained with the preparations of the European Patent No. 0 017 958, exhibit the desired abhesivity. They can be stoved already at relatively low temperatures of 200° C. Their thermoplasticity is slight compared with that of the resins, which were known at that time from the art. These preparations are very suitable especially for coating baking molds, which usually are not stressed very much mechanically. However, pans and pots, which are used for roasting, grilling, broiling, frying and cooking, are subjected to substantially higher mechanical stresses. Moreover, due to the hot fat or oil, higher temperatures are frequently reached during roasting, grilling, broiling and frying than during baking.

The present invention is therefore based on the task of finding preparations, which form abhesive surface coatings on the metal surface after stoving, the hardness of which is higher than that achievable with preparations of the art. The higher hardness is to be retained especially at temperatures of 200° C. and above. This so-called hot hardness is of special importance especially for the utility of the coated objects. The hot hardness must not diminish even after the frequent temperature changes, to which the coated objects are exposed. The coatings should have a high mechanical strength with a good bond to the metallic substrate. inadequate mechanical strength is a known disadvantage of the objects coated with polytetrafluoroethylene. The coatings, moreover, should not develop any physiologically hazardous degradation products if the pots and pans are inadvertently overheated.

From the published British Patent Application No. 2,152,946, abhesive coatings are known, which are obtained by stoving a silicone polyester resin. The essence of this invention is the addition of 20 to 200 parts by weight of a laminar solid, preferably mica, to 100 parts by weight of the curable silicone polyester resin. Surely certain physical properties of the cured surface layer are improved; for example, the hardness of this layer is increased and the permeability is reduced. However, these improvements are limited by the basic properties of the resin. It is therefore better to attempt to achieve the improvement in the properties of the cured surface layer by an improvement in the coating resin itself.

OBJECT OF THE INVENTION

Accordingly, it is the primary object of the invention to provide an abhesive coating preparation suitable for preventing the sticking of food debris on utensil surfaces and for facilitating the removal of food debris from the surface.

It is also an object of the invention to provide a method of applying an abhesive heat resistant coating to the surface of an object adapted to be subjected by high heat.

Generally, it is an object of the invention to improve on the art of abhesive coating preparations and methods for their application.

It is also an object of the present invention to provide preparations of the aforementioned type, in which the polysiloxane is modified in a particular manner in order to achieve the desired combination of properties.

SUMMARY OF THE INVENTION

The inventive preparation, which comprises polyol-modified polysiloxane A and reactive, linear polysiloxane B, is characterized by the fact that the multihydric alcohol A2, used for the modification of the polysiloxane A1, is an ester group-containing polyol of the general formula

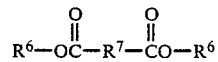

which can be obtained by the esterification of 1 mole of dicarboxylic acid HOOC—$R^7$p13 COOH with 2 moles of alcohol of formula $R^6OH$, the $R^6$ groups in the molecule being the same or different and representing the groups

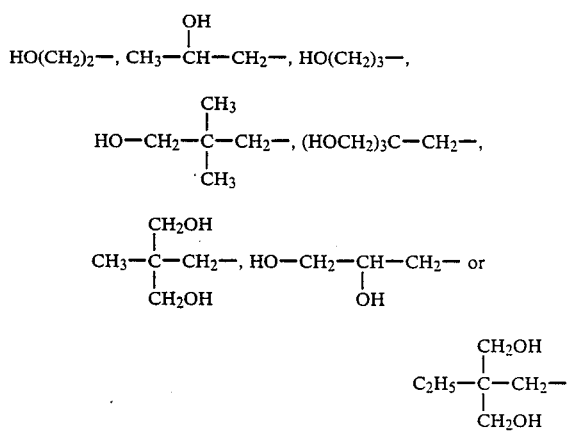

wherein $R^7$ is an alkylene, cycloalkylene or phenylene groups, and the polyol containing the ester groups has at least three hydroxyl groups.

The following groups are preferred as $R^6$ groups:

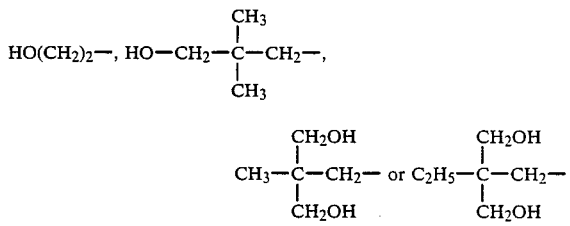

Phenylene is preferred as the $R^7$ group.

Formula I, by means of which the ester group-containing polyol is described, is to be regarded as an average formula. To some extent, oligomeric polyester polyols, that is, compounds in which the dicarboxylic acid unit is contained more than once, are also formed during the esterification of 2 moles of $R^6OH$ with 1 mole of dicarboxylic acid. These compounds need not be removed from the mixture. The synthesis of the ester group-containing polyols is familiar to those skilled in the art.

The usual esterifications catalysts can be used to accelerate the reaction. For the state of the art in this connection, reference is made to the European Patent No. 0 092 701.

The following are especially preferred ester polyols of the general formula I:

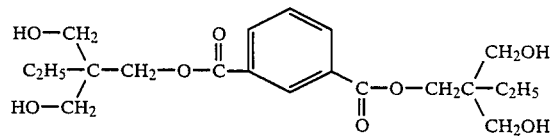

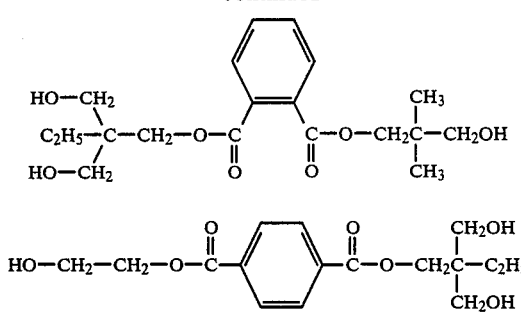

The reaction of the polysiloxane A1 with the polyster polyol of formula I takes place in such a molar ratio, that one SiOR¹ group corresponds approximately to one COH group. The ratio of SiOR¹ or COH can lie within the limits of 0.8 to 1.2. However, a ratio or quotient of 1 is preferred.

The reaction of the reactants is terminated after a conversion of 25 to 90%. It has turned out that a higher degree of conversion facilitates the reaction between the modified polysiloxane A obtained and the reactive, linear polysiloxane B. The reaction between polysiloxane A1 and the polyester polyol A2 is therefore preferably carried out as far as a 50 to 80% conversion. In spite of the high degree of conversion, the modified polysiloxane A has a relatively low viscosity and can therefore be handled well.

Polysiloxane A1 and the reactive, linear polysiloxane B are products known from the art and are described, for example, in the European Patent No. 0 017 958.

Polysiloxane A1 and the reactive, linear polysiloxane B are products known from the art and are described, for example, in the European Patent No. 0 017 958.

In the polysiloxane A1 of the general formula

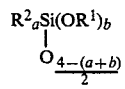

$R^1$ preferably is a —OC$_2$H$_5$ group. $R^2$ preferably is the methyl and/or the phenyl grup. Subscript a has a value of 1 to 1.5 and preferably of 1.1 to 1.4. Subscript b has a value of 0.1 to 0.8 and preferably of 0.3 to 0.7.

In the linear siloxane B of the general formula

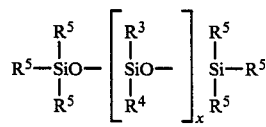

$R^3$ and $R^4$ preferably are methyl groups, with the proviso that up to 10 mole percent of the methyl groups can be replaced by phenyl groups. $R^5$ can also assume this meaning; however, at least one $R^5$ group must be capable of reacting with a SiOR¹ or COH group. Such a reactive group is the Cl, HO, LiO or $R^8$O group, $R^8$ being a lower molecular weight alkyl moiety with 1 to 4 carbon atoms or an acyl moiety. Preferably, $R^8$ is methyl, ethyl or acetyl. It is already sufficient if one $R^5$ group is capable of reacting with the SiOR¹ or COH group. However, more than one $R^5$ group, for example, two, three or all $R^5$ groups, may be capable of reacting.

The subscript x may be 0; preferably, however, it is greater than 0 and has a value especially of 10 to 500, a value of 15 to 150 being particularly preferred.

Examples of such polysiloxanes B are:

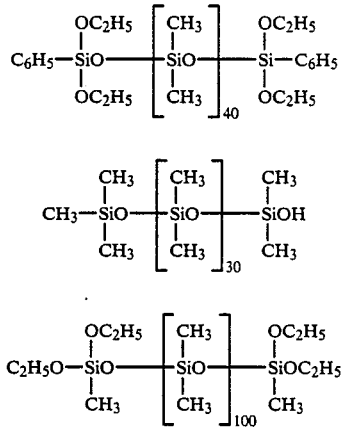

Curing agents, such as butyl titanate or tin octoate, pigments and fillers, such as titanium oxide or carbon black, as well as wetting agents and leveling agents such as lecithin or ethylcellulose, can be added in the usual amounts and in the conventional manner to the inventive preparations.

The substrate is coated with the preparations by spraying, by means of a doctor blade, by painting or by dipping and is then stoved or baked on. The stoving temperature depends on the nature of the resin and on the catalyst that may have been added. A 10 to 40 μm thick coating is achieved in this manner.

The invention is described in greater detail in the following by means of examples, it being understood that these examples are given by way of illustration and not by way of limitation.

1.1 SYNTHESIS OF A POLYESTER POLYOL A2 A2-I

Isophthalic acid (166 g) and 268 g of 2,2-di(hydroxymethyl)-1-butanol (trimethylolpropane) are heated with 100 g of xylene to 120° C. and 0.3 g of hypophosphoric acid are then added. The temperature is raised within 3 hours to 190° C. The water formed is distilled of azeotropically with the xylene. After an acid number of 70 to 100 is reached, nitrogen is passed in to drive out the water. The temperature is increased over a period of 3 hours to 220° C. The reaction is terminated when an acid number of less than 5 is reached. The distillate obtained consists of 36 g of water and 100 g of xylene. The OH number of the product is 560 mg KOH/g of substance.

1.2 SYNTHESIS OF A POLYESTER POLYOL A2 A2-II

Phthalic anhydride (148 g) and 62 g of ethylene glycol are heated to 145° C. The mixture is stirred at this temperature, until the acid number has fallen to 267. Now 134 g of trimethylolpropane are added. Under a stream of nitrogen, the temperature is raised over 4 hours to 220° C. On attaining an acid number of less than 5, the reaction is terminated. The amount of distillate is 18 g. The OH number of the product is 515 mg KOH/g of substance.

2.1 SYNTHESIS OF THE MODIFIED POLYSILOXANE A A-I

An alkoxypolysiloxane A1 (1,000 g) of formula

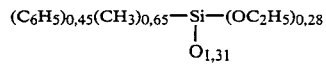

$$(C_6H_5)_{0.45}(CH_3)_{0.65}-\underset{O_{1.31}}{Si}-(OC_2H_5)_{0.28}$$

and containing 11.9% by weight of $-OC_2H_5$, 263 g of polyester polyol A2-I, 381 g of ethylene glycol dimethyl ether, 761 g of xylene and 0.2 g of butyl titanate are added to a distillation apparatus and heated with stirring. The reaction commences at 135° C. After 73 g of ethanol have been distilled over, the batch is cooled. The amount of ethanol corresponds to a 60% conversion. The stoving residue of the product after 1 hour at 180° C. is 50%. The product has a viscosity of 250 mm$^2$/sec.

2.2 SYNTHESIS OF THE MODIFIED POLYSILOXANE A A-II

An alkoxypolysiloxane AI (1,000 g) of formula

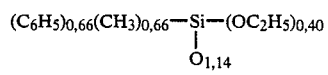

$$(C_6H_5)_{0.66}(CH_3)_{0.66}-\underset{O_{1.14}}{Si}-(OC_2H_5)_{0.40}$$

containing 14.4% by weight of $-OC_2H_5$ groups, 318 g of polyester polyol A2-II, 1171 g of methyl isoamyl ketone and 0.2 g of butyl titanate are added to a distillation apparatus and heated with stirring. The reaction commences at 140° C. After 96 g of ethanol have been distilled off, the batch is cooled. The amount of ethanol corresponds to a 65% conversion. The stoving residue of the product is 50%. The product has a viscosity of 120 mm$^2$/sec.

3.1 SYNTHESIS OF AN INVENTIVE PREPARATION Z--I

Modified siloxane resin A--I (100 g) is mixed with 0.4 parts by weight of siloxane B--I of formula

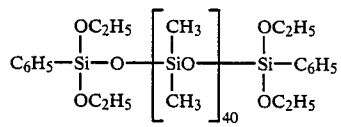

and treated with stirring with 0.5 parts by weight of $(BuO)_4$-Ti catalyst.

3.2 SYNTHESIS OF AN INVENTIVE PREPARATION Z--II

Modified siloxane resin A--II (100 g) is mixed with 0.2 parts by weight of siloxane B--II of formula

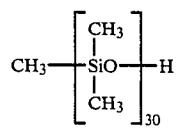

and treated with stirring with 0.5 parts by weight of $(BuO)_4$-Ti catalyst.

TESTING THE APPLICATION OF THE INVENTIVE PREPARATIONS Z--I AND Z--II

Preparations Z--I and Z--II (100 g of each) are pigmented with 50 g of titanium dioxide. The lacquers are applied with a doctor blade on aluminum test panels (Bonder 1401 A1) and, after a venting time of 15 minutes, cured in a circulating air oven for 10 minutes at 270° C. The thickness of the layer is 30 to 35 μm.

The following tests were carried out:
1. Pencil hardness according to the ECCA Standard T4-ISO 3270-ASTM D 3363.
2. Cross hatch test according to DIN 53151 ISO 2409
3. Oil Test:
   The coated test panel is kept for 3 hours at 200° C. in olive oil. The cross hatch test is then carried out and the pencil hardness determined.
4. Steam Test:
   A coated panel is mounted 2 cm above the spout of a small water kettle (with a spout diameter of 1.7 cm) in such a way, that the steam strikes, and condenses on the coated surface. The test lasts for 10 minutes. During this time, about 140 to 150g of water are vaporized. After that, double strokes without pressure are carried out on the coated surface with a coarse linen material (cheese cloth) that has been folded 7 times. The number of double strokes, after which the vaporized surface becomes dull, is measured.
5. Fried Eggs Test:
   An egg is fried on the coated panel. The separation of the egg from and the adhesion of residues to the coated panel as well as any discoloration of the coating are evaluated.
6. Sugar Test:
   Sugar is heated on the coated panel until it becomes liquid and slightly brown. The molten sugar is then cooled until it solidifies, at which time it is pushed from the coated panel with a spatula. The amount of residue remaining and any discoloration of the coating are evaluated.
7. Condensed Milk Test:
   Condensed milk is heated on the coated panel until the water has evaporated from the milk. The panel is then cooled to room temperature and the adhesion of the residues and any discoloration are evaluated.
8. Acetic Acid Test:
   A coated panel is kept for 1 hour at 50° C. in 5% acetic acid. The cross hatch test is then evaluated.
9. Ketchup Test:
   A coated panel is kept for 3 hours in a ketchup solution heated to 100° C. The adhesion and any discoloration are then evaluated.

| Composition of the solution: | |
| --- | --- |
| Ketchup | 600 g |
| Solution of sodium chloride in water | 600 g |
| Paprika | 5 g |
| Pepper | 5 g |

The results of the application tests are summarized in the following Table. A coating of the state of the art is tested for comparison. This coating has the following composition:

A preparation (100 g) of a polysiloxane resin, reacted with a mixture of trimethylolpropane and ethylene glycol, with the above-named polysiloxane B--II (from Example 4 of the European Patent No. 0 017 958) is pigmented with 50 g of titanium dioxide. The lacquer is applied with a doctor blade on aluminum test panels (Bonder 1401 A1) and, after a venting time of 15 minutes, cured in a circulating air oven for 10 minutes at 270° C. The thickness of the layer is 32 μm.

| Coating | Z-I | Z-II | Comparison |
|---|---|---|---|
| Pencil Hardness | | | |
| at room temp. | 5 H | 5 H | H |
| at 150° C. | 4 H | 3 H | HB |
| at 200° C. | 4 H | 3 H | 2 B |
| Cross Hatch Test | GT 0 | GT 0 | GT 0 |
| Steam Test | >200 | 180 | 120 |
| Sugar Test | good separation | good separation | good separation, light brown spot |
| Condensed Milk Test | good separation | good separation | good separation, |
| Fried Egg Test | good separation | good separation | good separation, slight discoloration |
| Oil Test, 3 hours, 200° C. | | | |
| pencil hardness at 20° C. | 5 H | 4 H | B |
| cross hatch test | GT 1 | GT 0 | GT 1 |
| Acetic Acid Test | | | |
| cross hatch test | GT 0 | GT 0 | GT 0 |
| Ketchup Test | | | |
| cross hatch test | GT 0 | GT 0 | GT 1 |
| color | slightly yellow | slightly yellow | slightly red |

The results clearly show that the coatings produced from the inventive preparations have excellent abhesivity and hardness even at high temperatures and are therefore outstandingly usable for the given applications. The comparison example shows that comparable oil resistance and resistance to mechanical stresses could not be achieved especially at elevated temperatures with the materials that represented the state of the art.

What is claimed is:

1. A utensil, such as a baking tin, baking mold, frying pan, metal pot and the like having a surface which is adapted to be subjected to high heat, wherein said surface has an abhesive surface coating baked onto said surface, said coating comprising in heat-cured
   (a) a heat curable polysiloxane, modified with polyol, and
   (b) 0.05 to 4% by weight, calculated on the polysiloxane (a), of a linear siloxane which is reactive with the polysiloxane (a),
   said modified polysiloxane (a) being the reaction product of a polysiloxane of the general formula

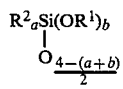

wherein
OR$^1$ is alkoxy derived from a primary or secondary alcohol with 1 to 4 carbon atoms,
R$^2$ is selected from the group consisting of alkyl and phenyl,
a = 1 to 1.5, and
b = 0.1 to 0.8, and
an ester group-containing polyol of the general formula

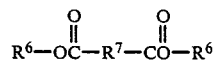

wherein R$^6$ is selected from the group consisting of

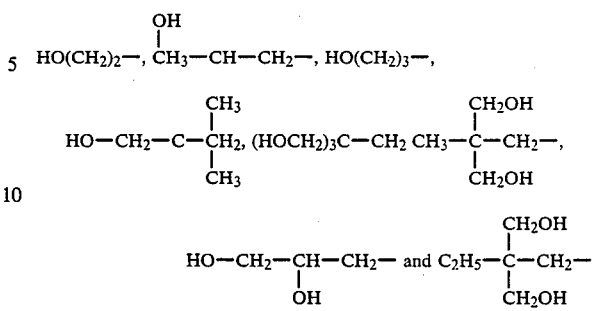

R$^7$ is alkylene, cycloalkylene or phenylene, and the polyol containing the ester groups has at least three hydroxyl groups, the reaction being carried out in such a molar ratio, that one SiOR$^1$ group corresponds approximately to one COH group and the reaction being terminated after a 25 to 90% conversion; said reactive linear polysiloxane (b) corresponding to the general formula

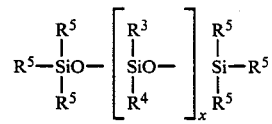

wherein
R$^3$, R$^4$ are the same or different and represent methyl or phenyl, with the proviso that at least 80 mole percent of R$^3$ and R$^4$ are methyl,
R$^5$ is selected from the group consisting of alkyl with 1 to 4 carbon atoms, phenyl and groups capable of reacting with the SiOR$^1$ or COH groups of the modified polysiloxane (a) with the proviso that at least one R$^5$ group is such a reactive group, and
x ≧ 0.

2. The utensil of claim 1, wherein said coating has a thickness of about between 10 to 40 mm.

3. A utensil as claimed in claim 1, wherein
R$^1$ is ethyl,
R$^2$ is selected from the group consisting of methyl and phenyl,
R$^6$ is

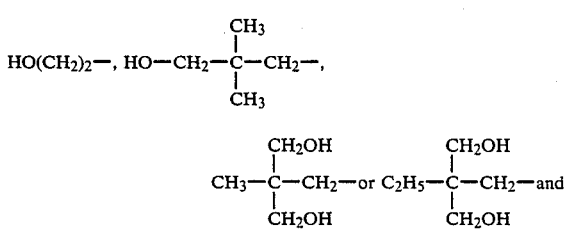

R$^7$ is phenylene.

4. An abhesive coating preparation comprising
(a) a heat curable polysiloxane, modified with polyol, and
(b) 0.05 to 4% by weight, calculated on the polysiloxane (a), of a linear siloxane which is reactive with the polysiloxane (a),
said modified polysiloxane (a) being the reaction product of a polysiloxane of the general formula

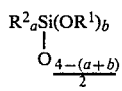

wherein
OR¹ is alkoxy derived from a primary or secondary alcohol with 1 to 4 carbon atoms,
R² is selected from the group consisting of alkyl and phenyl,
a=1 to 1.5, and
b=0.1 to 0.8, and
an ester group-containing polyol of the general formula

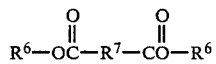

wherein R⁶ is selected from the group consisting of

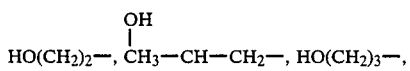

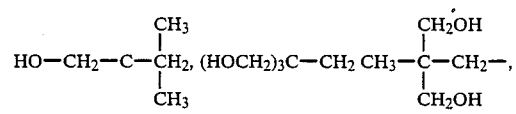

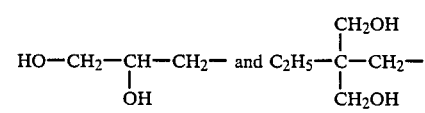

and
R⁷ is alkylene, cycloalkylene or phenylene, and the polyol containing the ester groups has at least three hydroxyl groups, the reaction being carried out in such a molar ratio, that one SiOR¹ group corresponds approximately to one COH group and the reaction being terminated after a 25 to 90% conversion;
said reactive linear polysiloxane (b) corresponding to the general formula

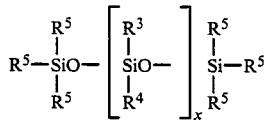

wherein
R³, R⁴ are the same or different and represent methyl or phenyl, with the proviso that at least 80 mole percent of R³ and R⁴ are methyl,
R⁵ is selected from the group consisting of alkyl with 1 to 4 carbon atoms, phenyl and groups capable of reacting with the SiOR¹ or COH groups of the modified polysiloxane (A) with the proviso that at least one R⁵ group is such a reactive group, and x ≧0.

5. The preparation of claim 4, wherein said ester group containing polyol is the esterification product of 1 mole of dicarboxylic acid HOOC—R⁷—COOH and 2 moles of an alcohol R⁶OH.

6. The preparation of claim 4 or 5, wherein
R¹ is ethyl,
R² is selected from the group consisting of methyl and phenyl,

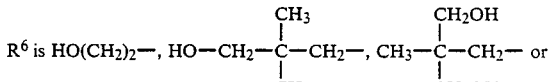

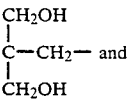

R⁷ is phenylene.

7. An abhesive coating composition as claimed in claim 4, wherein said ester group containing polyol is selected from the group consisting of

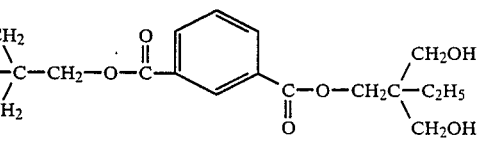

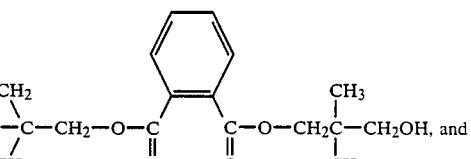

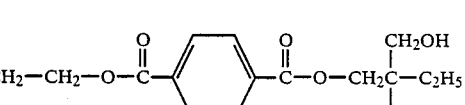

8. An abhesive coating composition as claimed in claim 4, wherein said molar ratio is such that the quotient SiOR¹ : COH is between about 0.8 to 1.2.

9. An abhesive coating composition as claimed in claim 4, wherein said reaction is terminated after a conversion of 50 to 80%.

10. An abhesive coating composition as claimed in claim 4, wherein said group capable of reacting with SiOR¹ or COH is selected from the group consisting of Cl—, HO—, LiO— and R⁸O, wherein R⁸ is lower alkyl with 1-4 carbon atoms or acyl.

11. An abhesive coating composition as claimed in claim 4, wherein x has a value of 10–500.

12. An abhesive coating composition as claimed in claim 4, wherein said polysiloxane (b) is selected from the group consisting of

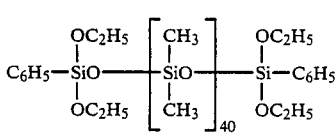

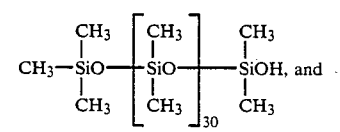

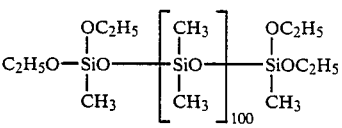

* * * * *